United States Patent [19]

Ono et al.

[11] Patent Number: 5,008,607

[45] Date of Patent: Apr. 16, 1991

[54] DRIVING SYSTEM FOR STEPPING MOTOR

[75] Inventors: Takeshi Ono, Yokohama; Masahiro Sakamoto, Tokyo; Tadashi Takano, Yokohama, all of Japan

[73] Assignee: Canon Kabushiki Kaisha, Tokyo, Japan

[21] Appl. No.: 372,822

[22] Filed: Jun. 29, 1989

[30] Foreign Application Priority Data

Jul. 1, 1988 [JP] Japan .............................. 63-162608

[51] Int. Cl.⁵ ................................................ H02P 8/00
[52] U.S. Cl. ..................................... 318/696; 318/685; 358/409
[58] Field of Search .................. 318/696, 685; 358/409

[56] References Cited

U.S. PATENT DOCUMENTS

| | | | |
|---|---|---|---|
| 4,145,643 | 3/1979 | Maeda et al. | 318/696 |
| 4,149,196 | 4/1979 | Wada et al. | 358/409 |
| 4,642,544 | 2/1987 | Furumura et al. | 318/696 |
| 4,701,687 | 10/1987 | Yoshimoto | 318/696 |

Primary Examiner—William M. Shoop, Jr.
Assistant Examiner—Saul M. Bergmann
Attorney, Agent, or Firm—Fitzpatrick, Cella, Harper & Scinto

[57] ABSTRACT

A driving system for a stepping motor wherein the stepping motor is rotated by a predetermined angle for each driving step. The system counts the time between two successive driving triggers, and changes at least one of the phase energization current and the phase energization time at the start of the driving of the stepping motor in response to the time count.

5 Claims, 6 Drawing Sheets

DRIVING SYSTEM FOR STEPPING MOTOR

BACKGROUND OF THE INVENTION

1. Field of the Invention

The present invention relates to a driving system for a stepping motor, wherein the stepping motor is rotatingly driven by a predetermined steps when a driving trigger is inputted.

2. Related Background Art

Generally, in a facsimile and the like, a stepping motor is used as a driving source for feeding a recording paper or an original in an auxiliary direction perpendicular to a main scanning direction where the original is read and/or an image is recorded on the recording paper. As a method for driving the stepping motor, one-phase-on drive (1-phase energization drive), two-phase-on (2-phase energization drive or a half-step drive (1-2 phase energization drive) has been already known; however, because of ability of fine control and high maximum operating frequency, the 1-2 phase energization drive or half-step drive has been adopted to drive the stepping motor for feeding the paper in the facsimile system and the like.

During the transfer of the recording paper or the original in such facsimile system, since times required for reading the original in the main scanning direction and/or for recording the image on the recording paper differ from time to time due to image pattern of the original image, coding and/or decoding, the paper must be intermittently fed or transferred in the auxiliary direction, and the intervals between two successive transfers of the paper are not uniform or consistent.

In general, when the stepping motor is driven intermittently, for example in order to rotate the stepping motor at a speed of 800 pps, at the beginning of the operation of the stepping motor, the stepping motor has been controlled to be gradually accelerated by increasing the pulse rate, such as from 400 pps to 600 pps and then to 800 pps, or decelerated by decreasing the pulse rate. Such controlling technique is disclosed in the U.S. Pat. No. 4,340,848.

Such controlling technique is effective when the motor is rotated at a high speed for a relatively long time at a predetermined time interval as in the case where the recording paper is fed and/or a carriage is shifted in a normal printer; however, when the stepping motor is rotated intermittently with uneven intervals and the number of each driving pulses is very small such as 4 steps, 8 steps and the like as in the case where the paper is fed in the facsimile system, there arise problems that the stepping motor cannot be adequately accelerated by such controlling technique and the excessive time is required for the acceleration and deceleration of the stepping motor.

SUMMARY OF THE INVENTION

An object of the present invention is to solve the above/mentioned problems and to smoothly rotate a stepping motor by counting intervals between driving triggers and by controlling phase energization energy or phase energization time in accordance with such intervals.

Other objects of the present invention will be apparent from the following detailed description regarding embodiments of the present invention.

DESCRIPTION OF THE PREFERRED EMBODIMENTS

The present invention will now be explained in connection with embodiments thereof with reference to the accompanying drawings.

Figure 1:
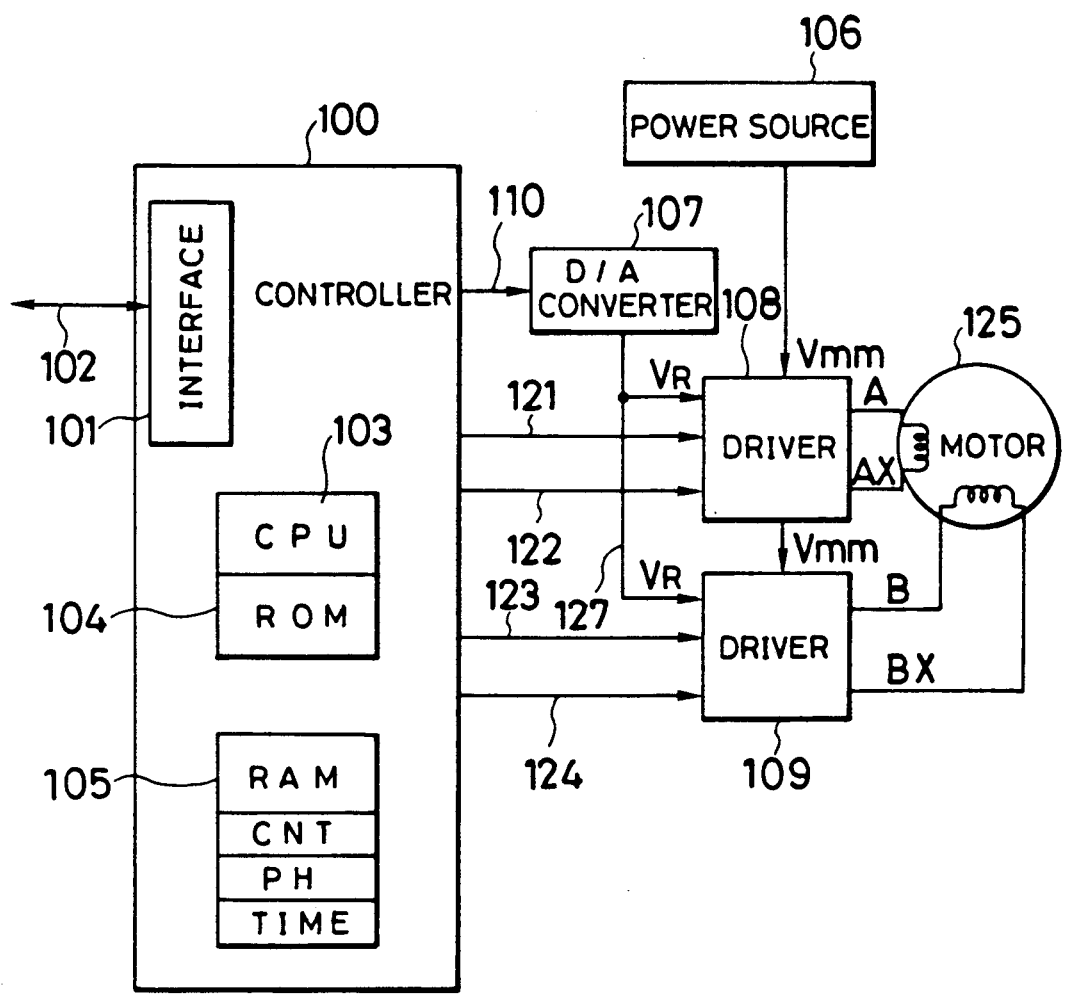
FIG. 1 is a schematic block diagram of a motor driving circuit according to a preferred embodiment of the present invention.
Figure 3:
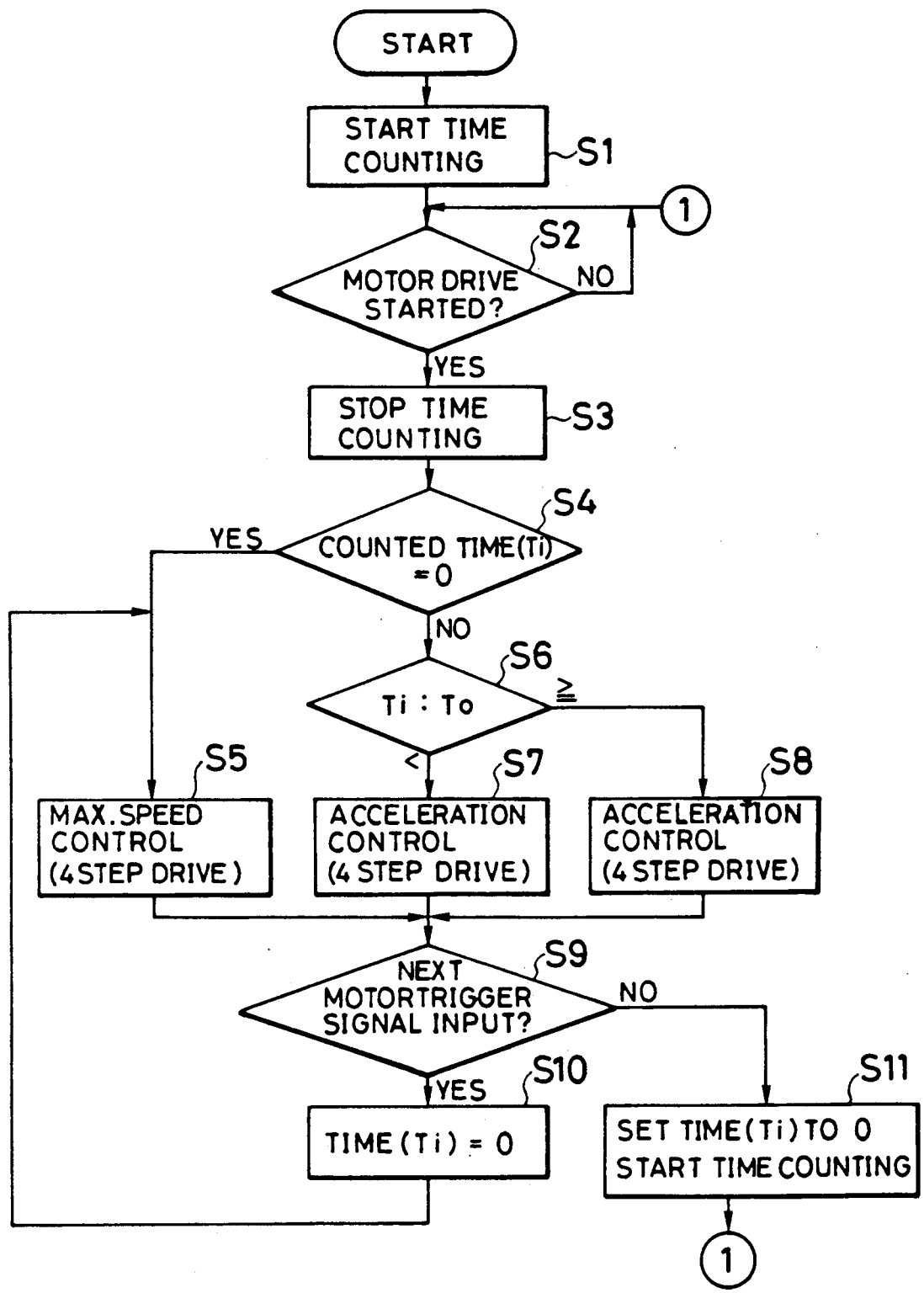
FIG. 3 is a flow chart of a motor drive process executed by a controller of FIG. 1.

FIG. 1 shows a control circuit for controlling a paper feeding stepping motor adopted to a recording portion of a facsimile system, where a controller 100 incorporating a CPU 103 such as a microcomputer therein includes an interface 101 for receiving control information from a main controller (not shown) of a facsimile system and the like and for sending information regarding the end of operation of the motor and/or error information to the main controller, a ROM 104 for storing a control program for the CPU 103 as shown in a flow chart of FIG. 3 and various data, and a RAM 105 used as a work area for the CPU 103. The RAM 105 includes a CNT for storing the number of revolution of a motor 125 (the number of steps) designated by the main controller, a PH for storing a present or actual energized phase of the motor 125, and a TIME for counting input cycles of motor driving triggers emitted from the main controller.

A power source 106 is provided for driving the stepping motor 125 and supplies an electric current of +24 V. A D/A converter 107 receives an energization energy control signal 110 comprising a digital signal with plural bits from the controller 100 and converts it into an analogue voltage signal 127 for output. The signal 127 is inputted to reference voltage input terminals $V_R$ of drivers 108 and 109. The drivers 108 and 109 are both driver circuits for driving the stepping motor as shown in FIG. 2 with detail and, in this case, each may be a driver circuit Model 3718(S) sold by Tomson Inc.

A signal 121 outputted from the controller 100 is a phase signal for controlling a direction of phase current flowing through an A-phase and is used for controlling the energization of the A-phase and the energization of a reverse phase (AX) to the A-phase. The controller 100 also outputs signals 122–124, where the signal 122 is a two-bit winding current control signal used for adjusting the energization energy of the A-phase, the signal 123 is a phase signal used for controlling a direction of phase current flowing through a B-phase to control the energization of the B-phase and the energization of a reverse phase (BX) to the B-phase, and the signal 124 is a winding current control signal used for adjusting the energization energy of the B-phase.

Figure 2:
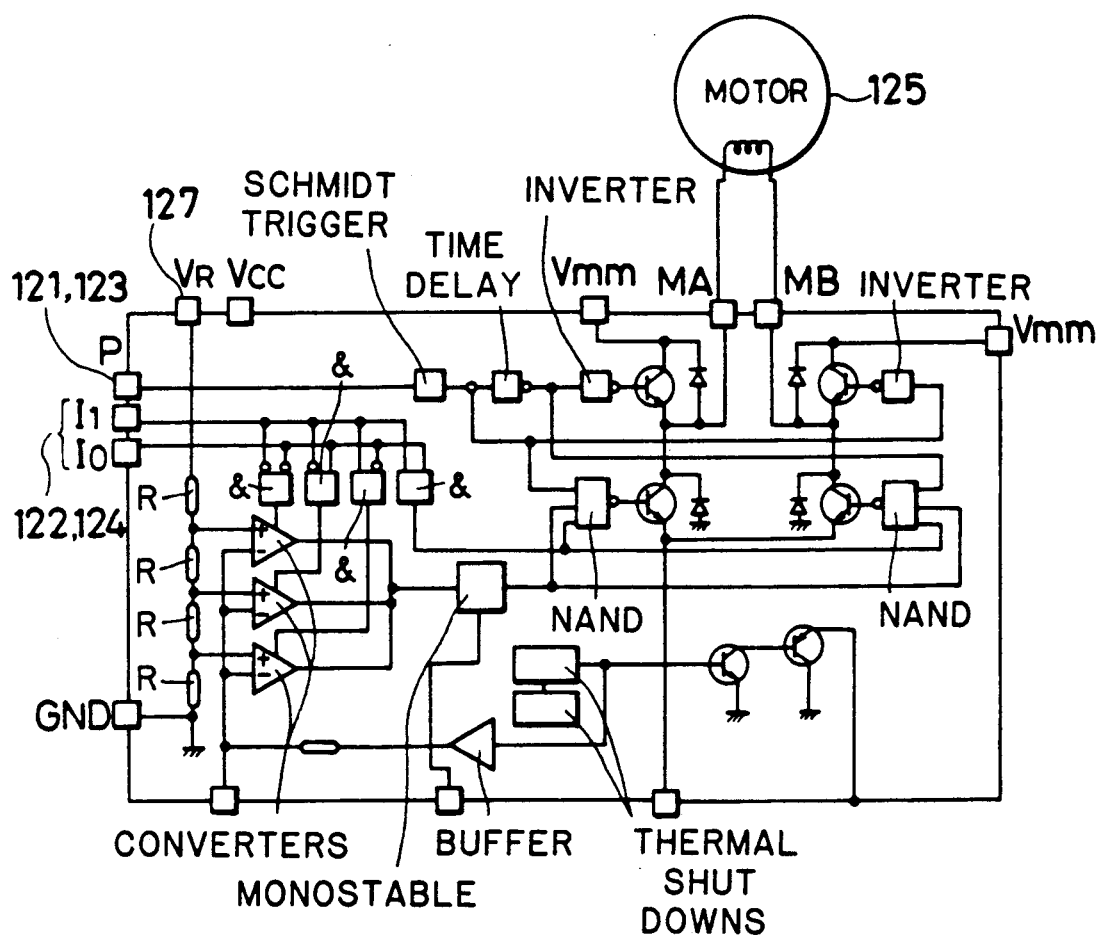
FIG. 2 is a detailed view showing a driver circuit of FIG. 1.

FIG. 2 is a block diagram showing a construction of the driver of FIG. 1, which is the driver circuit Model 3718(S) sold by Tomson Inc, as mentioned above.

The driver circuit is a bipolar chopper driver circuit wherein, since the reference voltage terminal $V_R$ thereof receives an output voltage from the D/A converter 107 as a reference voltage for determining a value of chopper current, the controller 100 can adjust the energization energy of the motor 125 by changing or altering the value of the signal 110. Further, the driver circuit is designed that it can adjust the energization energy of the stepping motor 125 by adjusting the driving voltage for the motor 125 at four stages by menas of the two-bit winding current control signal 122 or 124.

An example of the current control by means of the winding current control signal 122 or 124 is shown in the following Table 1.

TABLE 1

| $I_0$ | $I_1$ | Current Level |
|---|---|---|
| H | H | Non-current |
| L | H | Low current |
| H | L | Intermediate current |
| L | L | Maximum current |

In this way, the energization energy applied to the motor 125 can be controlled by the winding current control signals 122, 124 and the control signal 110.

As mentioned above, the signals 121 and 123 inputted to a P terminal are used for determining the direction of the phase current flow. When these signals are turned to HIGH level, the current flows from a terminal MA to a terminal MB through the windings of the motor 125. On the other hand, the phase signal 121 or 124 is in LOW level, the current flows from the terminal MB to the terminal MA through the windings of the motor 125. In this way, it is possible to change the direction of the phase energization of the motor 125. The driver 108, 109 each has a terminal Vmm for receiving the current of +24 V from the power source 106.

FIG. 3 is a flow chart showing the motor control process performed by the CPU 103 of the controller 100. The control program for executing this control process is stored in the ROM 104.

In FIG. 3, a time (start time) until motor drive start command is inputted from the main controller (not shown) is counted in a step S1. The counting operation may be started after initialization process is effected by the CPU 103 of the controller 100, or on the basis of command which is outputted from the main controller before the motor drive is initiated, for indicating or instructing the start of preparation of the motor drive operation. Then, when the motor drive start command (driving trigger) is inputted in a step S2, the sequence goes to a step S3, where the start time counting is stopped, and a value of the counted time is stored in the TIME of the RAM 105. Incidentally, such time counting may be performed by an appropriate timer (not shown) or executed in the program.

Figure 5:
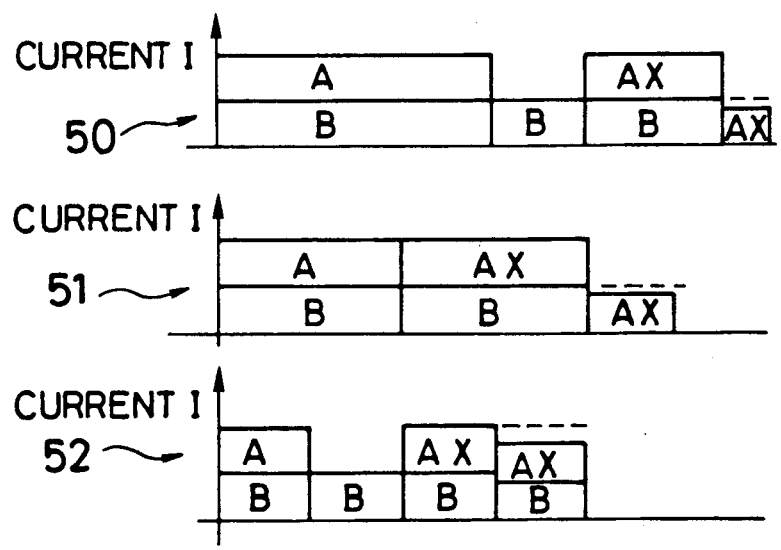
FIG. 5 is a timing chart showing a motor drive process of the stepping motor of FIG. 1.
Figure 6:
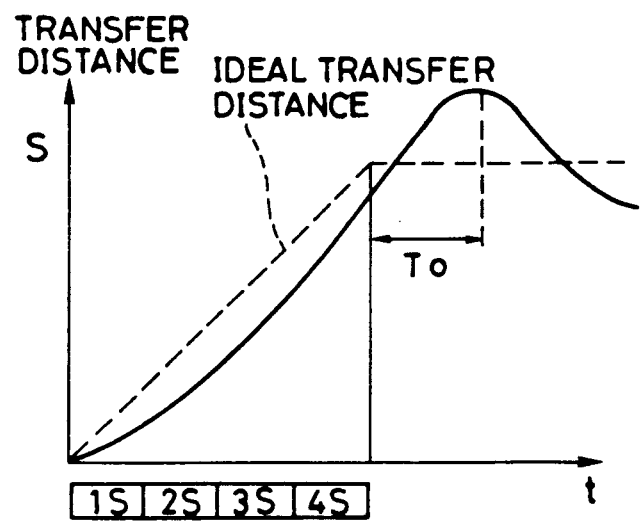
FIG. 6 is a graph showing a relation between conventional driving steps for a stepping motor and a transfer distance of a recording paper and the like fed by the rotation of the motor, and also showing the time of occurence of a motor overshooting as well as undershooting after the operation of the motor.

In a step S4, it is checked whether the time counting value (Ti) stored in the TIME is zero ("0") or not, and if zero, the sequence goes to a step S5, where the stepping motor 125 is rotated at the highest speed by a predetermined steps, as shown by "52" in FIG. 5.

If it is judged that the time counting value Ti is not zero in the step S4, the sequence goes to a step S6, where the value Ti is compared with a predetermined time value (To) stored in the ROM 104. If the value Ti is smaller that the predetermined value To, the sequence goes to a step S7, where the acceleration control as shown by "57" in FIG. 5 is performed. On the other hand, if time value Ti is not smaller than the predetermined value To (Ti≧To), the sequence goes to a step S8, where the acceleration control as shown by "50" in FIG. 5 is carried out. Incidentally, in these motor drive controls, the phase informations energized in correspondence to the respective motor drive controls are stored in the PH of the RAM 105.

In the steps S5, S7 or S8 the motor drive control is executed, and, after the motor 125 is rotated by a predetermined steps (for example, 4 steps), the sequence goes to a step S9, where it is judged whether the next motor drive start command (next motor trigger signal) has already been inputted or not. If the motor trigger signal has already been inputted, the value Ti in the TIME is reset to zero in a step S10, and thereafter, the sequence goes to the step S5, where the motor 125 is rotated at the highest speed.

On the other hand, if the next motor trigger signal is not inputted, the sequence goes to a step S11, where the timing counting is started again, and then, the sequence returns to the step S2, thus waiting the arrival of the next motor trigger signal.

Incidentally, the aforementioned predetermined value To corresponds to a time period from the stop of the energization of the motor to the occurence of the maximum motor overshooting after the motor is rotated by four steps.

Figure 4:
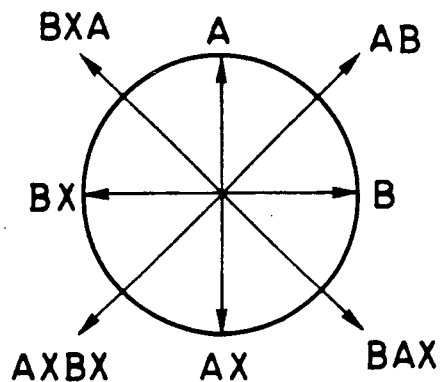
FIG. 4 is a view showing a torque vector of a stepping motor of FIG. 1.

FIG. 4 shows a torque model in the half-step drive (1–2 phase energization) for a bipolar motor, where an A-phase energization and B-phase energization are shown by A and B, respectively, and reverse phase energization thereof are shown by AX and BX, respectively.

FIG. 5 shows controlled conditions of the motor 125 driven by the illustrated motor drive circuit, where the abscissa indicates "time" and the ordinate indicates "current" supplied to the stepping motor 125. More particularly, FIG. 5 schematically shows the relation between the energization time and the driving power per each phase of the motor, when the energization is started from the condition that the motor is stopped at the A-phase.

In FIG. 5, an example that the stepping motor is rotated by four steps is illustrated, and "50"–"52" indicate the motor drive controls executed by the steps S8, S7 and S5 in the aforementioned flow chart, respectively.

The reference numeral "50" in FIG. 5 indicates the motor drive control performed when the motor 125 is driven from the condition that the waiting time for the next motor drive trigger signal is longer and thus the motor is completely stopped. Accordingly, in order to hasten or quicken the building-up (start) of the rotational drive of motor 125, the energization energy is increased and the energization time is extended in the first driving step. In the second driving step, the energization time for the B-phase is substantially the same as that in the case of the highest speed control shown by "52", and, in the third driving step, the energization time for two phases (AX, B) is extended a little. Lastly, in the fourth driving step, the energization time is shortened a little and the energization energy is also reduced lower than the normal 1-phase energization energy, thus minimizing the overshooting of the motor 125 after the motor drive is completed.

Incidentally, such energization energy can be adjusted by the aforementioned winding current control signals 122, 124 or control signal 110. Such adjustment of the energization energy by means of the signals can be similarly adopted to the following drive controls.

Next, the reference numeral "51" in FIG. 5 indicates the motor drive control performed when the start time (Ti) is less than the predetermined time (To). In this case, since the rotational force or inertia force to the same direction as that of the rotation in the previous drive control is still remaining in the motor, the energization time for energizing the A, B-phases is extended more or less in the first driving step. Further, in this case, the energization of the B-phase is omitted as in the case of the 2-phase energization. Then, the two phases (B, AX) are energized, and lastly, the AX phase is energized to stop the motor.

The reference numeral "52" in FIG. 5 indicates the timing of the motor drive control performed at the highest speed, where the motor 125 is driven at the highest speed. That is to say, this motor drive control is used when there is no waiting time (i.e., the time interval between the end of the phase energization by means of the previous driving trigger and the start of the next phase energization is "zero") and, thus, the inertia force to the same direction as that of the rotation effected by the previous driving trigger is still strongly remaining in the motor. In this case, in order to reduce the motor overshooting as well as undershooting after the motor 125 is stopped, the phase energization which is the same kind as that in the third driving step (by not changing the phase signals) but is powered down slightly is used to drive the motor in the fourth driving step.

Figure 7:
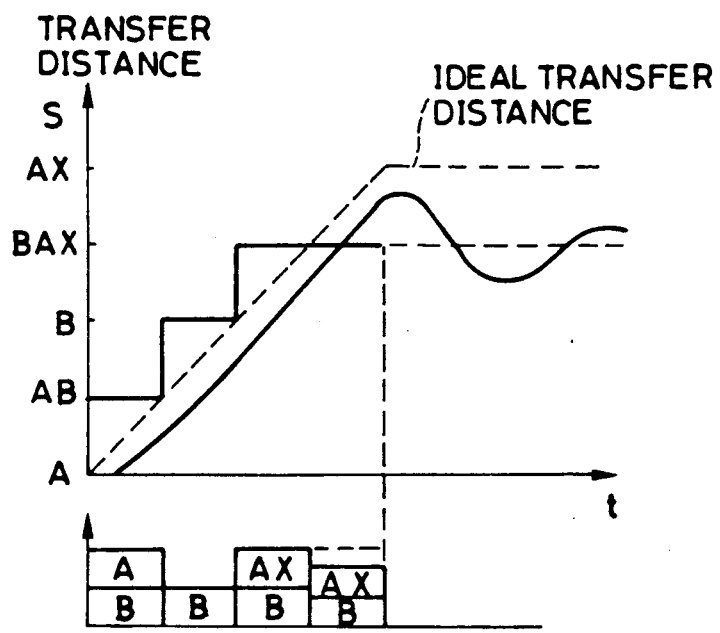
FIG. 7 is a graph showing a relation between motor driving steps effected by "52" of FIG. 5 and a transfer distance of a recording paper and the like fed by the rotation of the motor.

FIG. 7 shows a relation between the rotation of the motor 125 under the highest speed motor drive control and an actual transfer distance of the recording paper and the like obtained by such motor drive. As mentioned above, in this case, since the next motor drive is initiated immediately after the previous rotation of the motor is completed (i.e., after the A-phase energization is ended), the high speed rotation of the motor can be realized by utilizing the rotational force due to the inertia of the motor 125.

Figure 8:
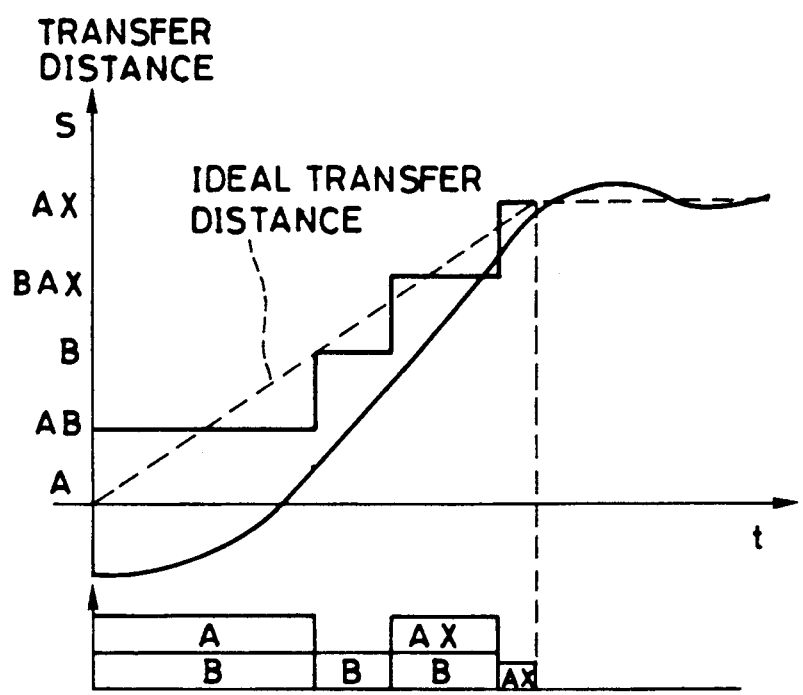
FIG. 8 is a graph showing a relation between motor driving steps effected by "50" of FIG. 5 and a transfer distance of a recording paper and the like fed by the rotation of the motor.

Further, FIG. 8 shows a relation between an amount of the rotation of the motor 125 under the motor drive control performed by "50" in FIG. 5 (in case of To≦Ti) and an actual transfer distance of the recording paper obtained by such motor drive. Here, although the last energization for the motor will be fundamentally the A-phase energization due to the previous drive control of the motor 125, the motor is controlled after the A, BX phases are energized without changing the phase energization in the fourth driving step.

Accordingly, in this case, the AB phase next the A-phase is firstly energized. And, by extending the energization time therefor and by increasing the energization energy therefor, the fully energized phase is adequately attracted to suppress the motor overshooting. Incidentally, in FIGS. 7 and 8, a broken line shows an ideal transfer distance of the recording paper and the like obtained the rotation of the motor.

In the illustrated embodiment, while an example that the time interval between the triggers is divided into three cases (Ti<To, Ti≧To, Ti=0) and the different motor drive controls are effected in accordance with such cases was explained, the present invention is not limited to such example; for example, time intervals may be divided into any plural cases more than two. Further, the energization current (energy) and energization time for each phase in the acceleration drive control and the highest speed drive control may be appropriately set selected.

Further, in the illustrated embodiment, while it was not judged what kind of the drive control was previously used, the kind of the previous drive control may be judged to determine the next drive control in correspondence to the previous drive control, thereby controlling the motor in accordance with overshooting as well as undershooting features of such controls.

As mentioned above, according to the present invention, by counting the time interval between the driving triggers for the motor and by performing the motor drive control in accordance with such time interval, it is possible to drive or rotate the stepping motor effectively and smoothly.

Further, by controlling the energization energy and/or energization time for each phase of the motor in accordance with the time interval, the acceleration control and highest speed control of the motor can be performed more quickly and effectively.

We claim:

1. A driving system for a stepping motor wherein a stepping motor is rotatively driven by a predetermined number of steps for each driving trigger, comprising:
    a stepping motor having a plurality of energization coils through each of which an energization current flows to drive said stepping motor;
    a plurality of drivers for applying said energization current to the respective energization coils of said stepping motor;
    a counting means for counting a time between two successive driving triggers; and
    an energization controlling means controlling said energization current of said stepping motor in response to said time counted by said counting means.

2. A stepping motor driving system according to claim 1, wherein, when said time counted by said counting means is small, said energization controlling means controls said energization current so that said stepping motor is rotated at a high speed.

3. A stepping motor driving system according to claim 1, wherein said energization controlling means controls said energization current for said plurality of drivers after inputting said driving trigger, in such a manner that said stepping motor is rotated by small driving steps for each driving trigger.

4. A stepping motor driving system according to claim 1, wherein said energization controlling means controls a current level of said energization current as well as an energization time.

5. A stepping motor driving system according to claim 3, wherein said stepping motor driving system is used in a facsimile machine.

* * * * *